United States Patent
Kondo

(10) Patent No.: US 8,625,150 B2
(45) Date of Patent: Jan. 7, 2014

(54) IMAGE PROCESSING DEVICE AND IMAGE FORMING DEVICE

(75) Inventor: Tomonori Kondo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 288 days.

(21) Appl. No.: 12/842,432

(22) Filed: Jul. 23, 2010

(65) Prior Publication Data

US 2011/0019246 A1 Jan. 27, 2011

(30) Foreign Application Priority Data

Jul. 24, 2009 (JP) ................................. 2009-173612

(51) Int. Cl.
| | | |
|---|---|---|
| H04N 1/46 | (2006.01) | |
| H04N 1/40 | (2006.01) | |
| H04N 1/393 | (2006.01) | |
| H04N 1/04 | (2006.01) | |
| G06K 9/00 | (2006.01) | |
| G06K 9/34 | (2006.01) | |
| G06K 9/36 | (2006.01) | |

(52) U.S. Cl.
USPC ............ 358/1.5; 358/537; 358/538; 358/539; 358/448; 358/452; 358/453; 358/474; 382/165; 382/167; 382/176; 382/289

(58) Field of Classification Search
USPC ........................................ 358/448, 474, 488
See application file for complete search history.

(56) References Cited

U.S. PATENT DOCUMENTS

| | | | | |
|---|---|---|---|---|
| 6,434,276 | B2 * | 8/2002 | Hirosawa et al. | 382/284 |
| 6,711,304 | B2 * | 3/2004 | White | 382/289 |
| 7,076,113 | B2 * | 7/2006 | Le Dinh | 382/261 |
| 7,095,526 | B1 * | 8/2006 | Housel | 358/1.18 |
| 7,551,802 | B2 * | 6/2009 | Ming | 382/284 |
| 7,978,358 | B2 * | 7/2011 | Otana | 358/1.15 |
| 2009/0009825 | A1 * | 1/2009 | Honda | 358/488 |

FOREIGN PATENT DOCUMENTS

| | | |
|---|---|---|
| JP | A-2003-244420 | 8/2003 |
| JP | A-2009-017409 | 1/2009 |

* cited by examiner

*Primary Examiner* — Benny Q Tieu
*Assistant Examiner* — Haris Sabah
(74) *Attorney, Agent, or Firm* — Muncy, Geissler, Olds & Lowe, PLLC

(57) ABSTRACT

An image processing device includes an image data acquiring part that acquires the first and second image data, an edge characteristic extraction part that extracts first edges and second edges forming the shapes of the rectangular regions contained in the first and second image data, a rectangular characteristic calculating part that extracts both a first calculated rectangular region formed by the first edges and a second calculated rectangular region formed by the second edges, a position adjustment parameter calculating part that calculates parameters indicating a separation distance and a separation angle between the first calculated rectangular region and the second calculated rectangular region when the first image data and the second image data are overlapped, and an image data correction part that corrects at least one of the first image data and the second image data by shifting and rotating based upon the parameters.

16 Claims, 10 Drawing Sheets

IMAGE PROCESSING DEVICE AND IMAGE FORMING DEVICE

CROSS REFERENCE

The present application is related to, claims priority from and incorporates by reference Japanese patent application number 2009-173612, filed on Jul. 24, 2009.

TECHNICAL FIELD

The present invention relates to an image processing device and an image forming device having thereof, and particularly relates to an image processing device that corrects positions so as to align two image data when they overlap, and an image forming device having the image processing device.

BACKGROUND

Conventional image forming devices have a scanner function that converts a medium, such as paper, into image data and a printing function that prints the image data. Further, such image forming devices have an image display that displays image data and an image editor for correcting a position of image data, in order to overlap and align two image data.

When both sides of a manuscript are printed, the image forming device performs a process to reverse the image data on the back side (reverse horizontal or reverse vertical); next, performs a process to synthesize the reversed image data on the back side and the image data on the front side; and further performs a process to display the synthesized image data on the image display. Then, while browsing the synthesized image displayed on the image display, a user manually moves the image data of the back side, which was reversed by the image edit means, and to adjust the position of the image data to align a medium region contained in the reversed image data on the back side with a medium region contained in the image data on the front side. With this manual operation, the image forming device can print both sides where the image data are aligned. See JP Laid-Open Publication No. 2003-244420.

SUMMARY

However, in the conventional image forming device, a user manually adjusts positions so as to align image data on the front side and the back side, which is troublesome.

The present invention has been accomplished to solve the problem, with the objective of providing an image processing device that aligns the shape of a rectangular region contained in first image data with the shape of a rectangular region contained in second image data only by entering the first image data and the second image data, and to provide an image forming device having such image processing device.

In order to solve the above-described problem, an image processing device according to claim 1 of the present invention is a image processing device that acquires both first image data and second image data, each of which is included in a rectangular region, wherein the shape and area of the rectangular regions are the same, and the image processing device aligns the shape of the rectangular region of the first image data with that of the second image data, and the image processing device provides a image data acquiring part, an edge characteristic extraction part, a rectangular characteristic calculating part, a parameter characteristic calculating part, a parameter calculating part, and a image data correction part.

The present invention provides the superior effects mentioned below.

According to the present invention, a user uses a scanner to read rectangular medium, and the user merely enters first image data containing the shape of the rectangular region produced by the scanner and second image data containing the shape of the rectangular region into an image processing device, and then, image data where the shape of the rectangular region contained in the first image data is aligned with the shape of the rectangular region contained in the second image data can be provided. Since the user can avoid manually adjusting the image position, the time required is dramatically reduced.

PREFERRED EMBODIMENTS OF THE INVENTION

First Embodiment

Figure 1:
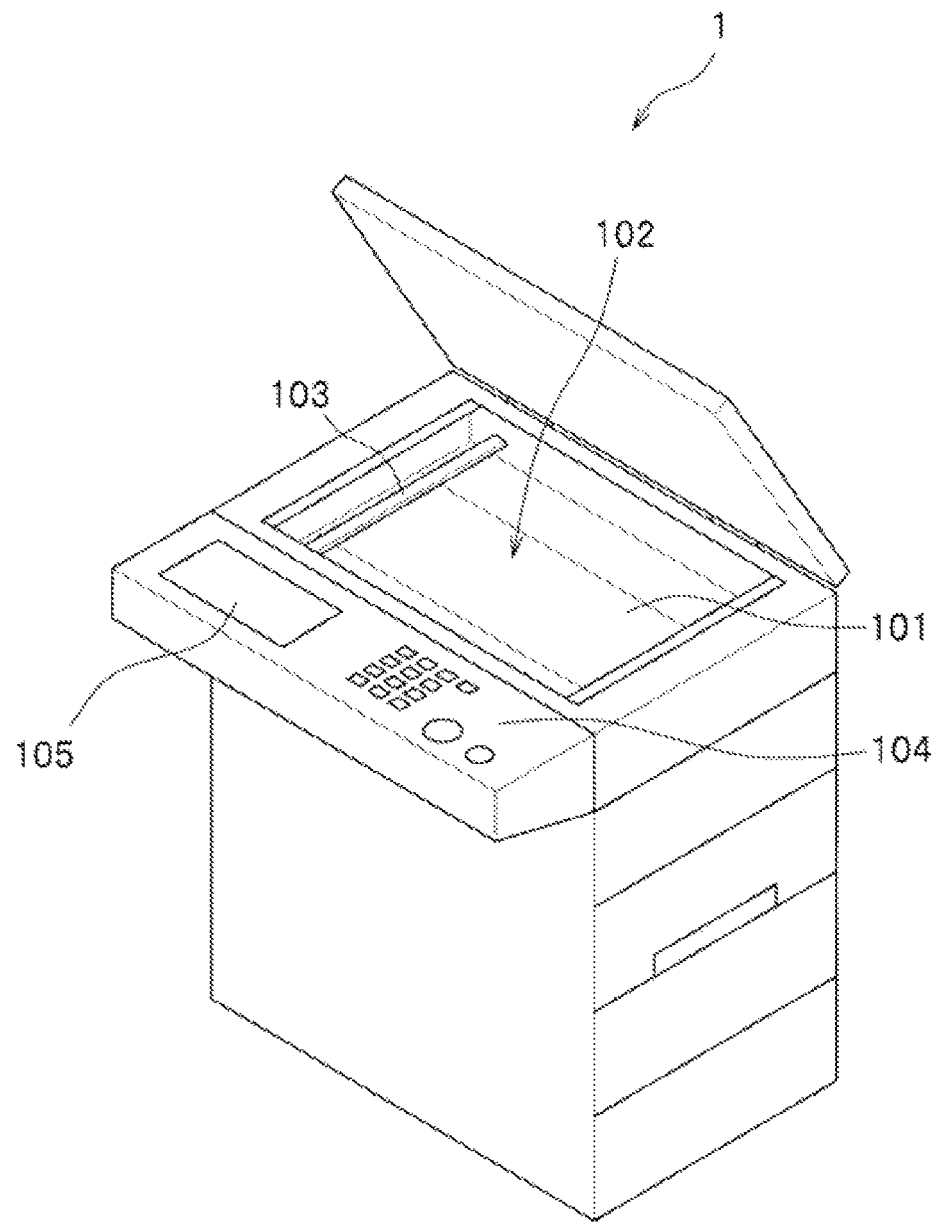
FIG. 1 is a perspective view of an image forming device in a first embodiment.
Figure 2:
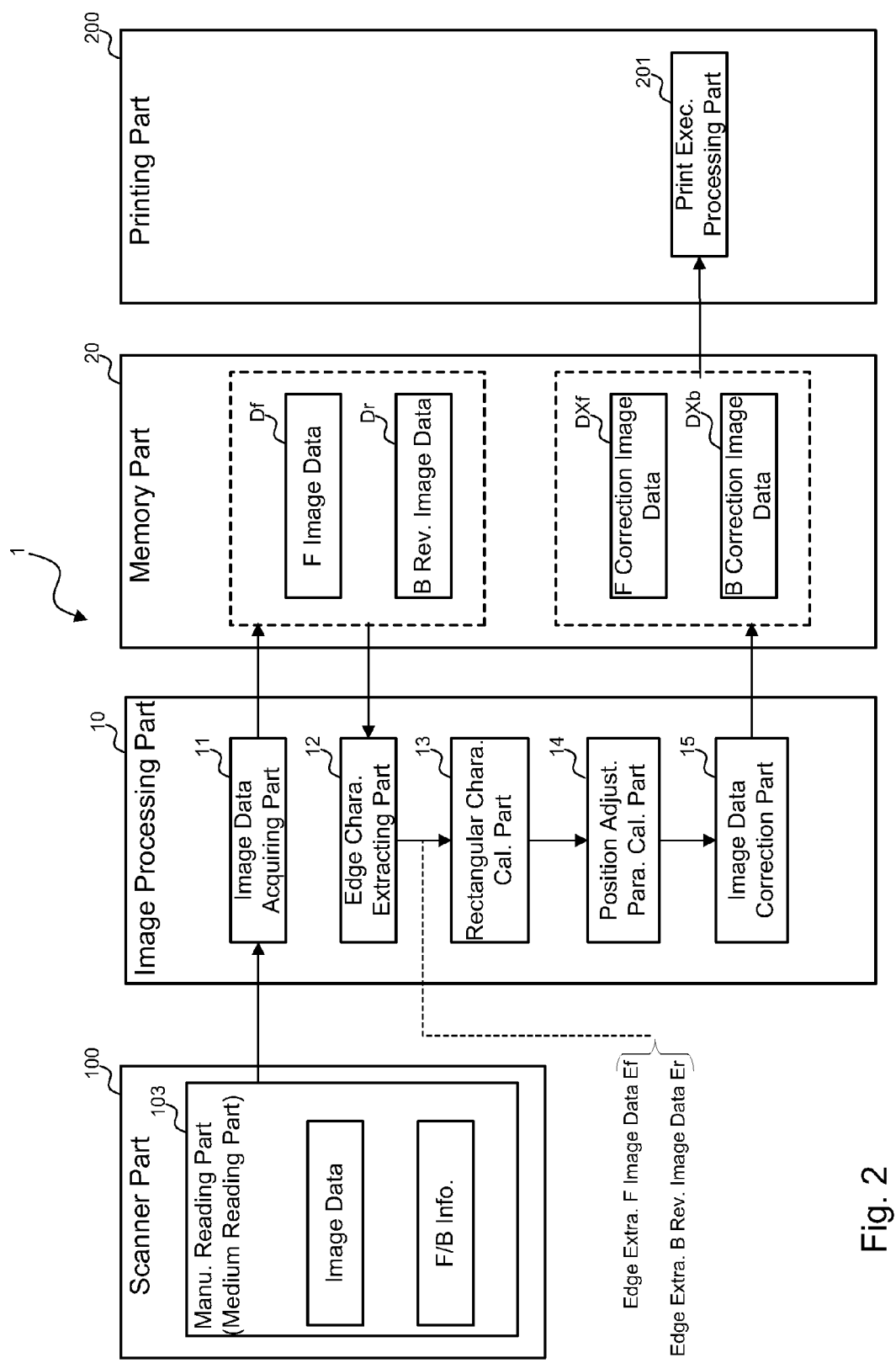
FIG. 2 is a block diagram illustrating a configuration of the image forming device equipped with an image processing device in the first embodiment.

Next, a first embodiment of an image forming device having the image processing device is explained with reference to the drawings. FIG. 1 is a perspective view of the image forming device, and FIG. 2 is a block diagram illustrating a configuration of the image forming device having an image processing device (display processing unit).

(Configuration of Image Forming Device)

An image forming device 1 reads a placed manuscript (rectangular medium) and copies the manuscript (copy printing). As shown in FIG. 2, the image forming device 1 has a scanner part 100 that reads the placed manuscript and produces image data, an image processing part 10, a memory part 20 and a printing part 200 that prints the image data.

The scanner part 100 is a constituent part that reads the shape of the manuscript (rectangular medium) and produces image data containing a rectangular region, which is the shape of the manuscript. The scanner part 100 has a platen 101 where the manuscript is placed, a manuscript detecting part 102 that detects the manuscript placement, a manuscript reading part 103 that is equipped with an image sensor, reads the manuscript and produces image data, an operation part 104 that is equipped with an input means, such as a switch or button, for providing an instruction from a user U to the image forming device 1, and a display unit 105 having a display means, such as a liquid crystal display screen, for displaying a status of the image forming device 1 (FIG. 1). Herein, the operation part 104 and the display unit 105 may be a touch panel where the screen by the liquid crystal display and the switch are integrated.

The image processing part 10 in the first embodiment is for adjusting positions for the purpose of printing by aligning four corners on the front side of the manuscript read by the manuscript reading part 103 with those on the back side. The image processing part 10 is equipped with image data acquiring part 11, an edge characteristic extracting part 12, a rectangular characteristic calculating part 13, a position adjustment parameter calculating part 14 and an image data correction part 15.

(Image data acquiring part 11) The image data acquiring part 11 has reverse direction information in advance and acquires two sets of image data produced by reading the front side and the back side of the manuscript by the manuscript reading part 103, respectively. The image data acquiring part 11 further acquires front/back information indicating whether the image data is a front side of the manuscript or a back side of the manuscript. Then, if the data is the image data of the front side (front image data Df), the data is stored in the memory part 20 as is. If the data is image data of the back side (back image data Db), the back reversed image data Dr where the back image data Db is reversed based upon the reverse direction information, is stored in the memory part 20. The image data acquired from the manuscript reading part 103 covers an area larger than the actual size of the manuscript, and it is assumed that the data is read without missing any edges of the manuscript. Herein, the image data acquiring part 11 allows the front image data Df and the back reversed image data Dr to be stored in the memory part 20, but the front image data Df and the back reversed image data Dr can be outputted to the edge characteristic extracting part 12 without storing.

The two-side information is information obtained when reading the manuscript, and for example, concerning whether the image data produced by the scanner part 100 is front side data or back side data of the manuscript, if the read order is an odd number, the data is considered to be from the front side of the manuscript, and if the read order is an even number, the data is considered to be from the back side of the manuscript. The reverse direction information is data concerning whether the reversal is horizontal or vertical and is stored in the image data acquiring part 11 in advance in the present embodiment, but the reverse direction information can be stored in the memory part 20, and every time image data is acquired from the manuscript reading part 103, the data may be acquired from the memory part 20. Further, the reverse direction information is information that can be set by selecting "reverse horizontal" or "reverse vertical" by the user U via the operation part 104. Then, since the reverse direction information is information that can be displayed on the display unit 105, the user U can perform the reversal by horizontally or vertically reversing the manuscript on the platen 101 after the information is confirmed.

(Edge Characteristic Extracting Part 12) The edge characteristic extracting part 12 is an extracting part that acquires the front image data Df (or the back reversed image data Dr) from the memory part 20 and that extracts image data (edge extraction front image data Ef or edge extraction back reversed image data Er) where pixels corresponding to the edges of the manuscript from the front image data Df are extracted.

The edge characteristic extracting part 12 performs processing to extract the edge extraction front image data Ef as described below. The edge characteristic extracting part 12 detects the edges of the manuscript from the front image data Df using a Sobel filter, and extracts all edge pixel data forming the edges. Herein, two matrices of coefficients for vertical line detection and for transverse line detection, respectively, are used for the Sobel filter, and the edges of the manuscript in the transverse direction (transverse edge characteristic data) are extracted with the matrix of coefficients for transverse line detection, and the edges of the manuscript in the vertical direction (vertical edge characteristic data) are extracted with the matrix of coefficients for vertical line detection. Due to the processing described above, two image data of transverse edge characteristic image data that edge characteristic in the horizontal direction is stand out with respect to the image data and vertical edge characteristic image data that edge characteristic in the perpendicular direction is stand out with respect to the image data are obtained. Herein, well-known Sobel derivation, etc. is used.

In addition, the edge characteristic extracting part 12 binarizes the transverse edge characteristic image data and the vertical edge characteristic image data with predetermined threshold values. Then, the edge characteristic extracting part 12 performs the logical OR operation to the binarized two image data and extracts all pixels corresponding to the edges and produces the edge extraction front image data Ef. Next, the edge characteristic extracting part 12 outputs the edge extraction front image data Ef to the rectangular characteristic calculating part 13. Herein, the edge characteristic extracting part 12 performs the logical OR operation (OR operation) between pixels at the same position with the two image data, and extracts the pixels whose result of the OR operation is "1" as "pixels corresponding to the edges." Further, the edge characteristic extracting part 12 performs the above-mentioned processing on the back reversed image data Dr, as well, and extracts the edge extraction back reversed image data Er.

Herein, one example of the matrix of coefficients for transverse line detection to be used as the Sobel filter is shown in Expression (1), and one example of the matrix of coefficients for vertical line detection is shown in Expression (2). For this Expression (2), a determinant (filter) with the size of 3×3 is used.

(Expression 1)

$$\begin{pmatrix} -1 & -2 & -1 \\ 0 & 0 & 0 \\ 1 & 2 & 1 \end{pmatrix} \quad (1)$$

(Expression 2)

$$\begin{pmatrix} -1 & 0 & 1 \\ -2 & 0 & 2 \\ -1 & 0 & 1 \end{pmatrix} \quad (2)$$

The performance of the processing (filter operation) using the Sobel filter results in a replacement of tone value of marked pixels with a weighted linear sum of the tone values between the marked pixels and peripheral pixels. Since this is executed for the entire image, the tone value of the marked pixels becomes greater at a section with a more drastic change in the image, and the characteristic of the edges is noticeable. Herein, the edge characteristic extracting part 12 binarizes the transverse edge characteristic image data and the vertical edge characteristic image data with the predetermined threshold values, but the edge characteristic extracting part 12 can be set to prepare a histogram in the image data and to separate a predetermined quantity based upon the histogram.

(Rectangular Characteristic Calculating Part 13) The rectangular characteristic calculating part 13 is a calculating part to acquire the edge extraction front image data Ef from the edge characteristic extracting part 12, to combine the edge pixel data (pixels corresponding to the edges) contained in the edge extraction front image data Ef, to extract a rectangular region S (front rectangular region Sf), and to calculate the rectangular characteristic information of the rectangular region S. Then, the rectangular characteristic calculating part 13 outputs the rectangular characteristic information to the position adjustment parameter calculating part 14. In the present embodiment, the rectangular characteristic calculating part 13 Hough-transforms four sides of the rectangular regions as the rectangular characteristic information, and calculates an equation of straight line (L ($\theta$, $\rho$)) expressed with two-dimensional polar coordinates (circular polar coordinates). Herein, $\theta$ is a deflection angle expressed with a radian and $\rho$ is a moving radius, and their ranges are $0 \leq \theta < 2\pi$ and $0 \leq \rho$.

Figure 3:
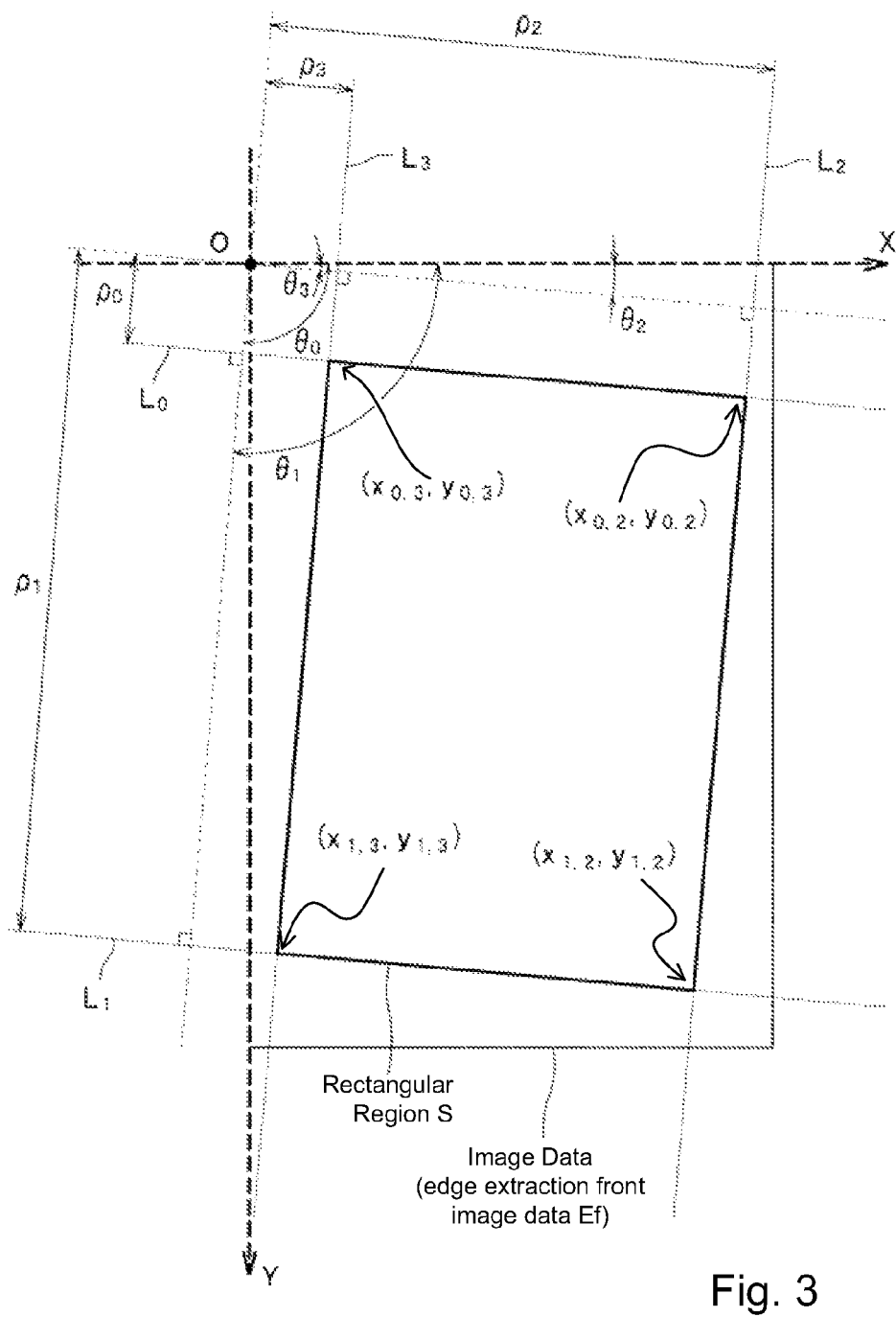
FIG. 3 illustrates a relationship between image data (edge extraction image data) read by the image forming device in the first embodiment and plane coordinates expressed with an X axis and a Y axis.

FIG. 3 illustrates a rectangular region S (front rectangular region Sf) extracted by the rectangular characteristic calculating part 13. The rectangular characteristic calculating part 13 performs the processing to calculate the rectangular characteristic information of this front rectangular region Sf. The rectangular characteristic calculating part 13, first, acquires the edge extraction front image data Ef from the edge characteristic extracting part 12, extracts the edge pixel data contained in the edge extraction front image data Ef, and produces a region where adjacent edge pixels with each other are combined. Such processing is realized by connected processing of four or eight vicinity pixels well-known as connection processing of vicinity pixels or labeling process.

Then, the rectangular characteristic calculating part 13 produces two-dimensional plane coordinates using the upper left of the image data (edge extraction front image data Ef) as a point of origin O, and calculates an area of the produced regions, respectively. The area is calculated based upon maximal value and minimal value of x-coordinate value and a y-coordinate value in the regions. The maximal value $x_{max}$ of the x-coordinate value, the minimal value $x_{min}$ of the x-coordinate value, the maximal value $y_{max}$ of the y-coordinate value, the minimal value $y_{min}$ of the y-coordinate value are extracted from the region, and an area s is calculated using Expression (3).

(Expression 3)

$$s = (x_{max} - x_{min}) \cdot (y_{max} - y_{min}) \tag{3}$$

Herein, the rectangular characteristic calculating part 13 produces two-dimensional plane coordinates using the upper left of the image date as a point of origin O, but the position of the point of origin O may be a center of the image data or at any position.

Then, the rectangular characteristic calculating part 13 acquires the region of the maximal area s, performs the thinning processing on a row (line) where edge pixels forming the region are combined, and extracts lines (straight lines) to be sides of the region. This thinning process is performed using a known method.

If the rectangular characteristic calculating part 13 performs, on two-dimensional plane coordinates, a Hough-transformation using an angle $\theta_0$ formed with a normal passing through the point of origin O from one side (straight line $L_0$) of the region and the X-axis (at the positive side) and the shortest distance $\rho_0$ between the point of origin O and the straight line $L_0$ (corresponding to a distance between an intersection point of the normal and the straight line $L_0$, and, the point of origin O), the straight line $L_0$ can be expressed with Expression (4).

(Expression 4)
Straight line $L_0$ ($\theta_0$, $\rho_0$)

$$\rho_0 = x \cos \theta_n + y \sin \theta_0 \tag{4}$$

If the Hough-transformation is similarly performed for the other three sides, the sides can be expressed with Expressions (5-1) (5-3).

(Expressions 5-1 to 5-3)
Straight line $L_1$($\theta_1$, $\rho_1$)

$$\rho_1 = x \cos \theta_1 + y \sin \theta_1 \tag{5-1}$$

Straight line $L_2$ ($\theta_2$, $\rho_2$)

$$\rho_2 = x \cos \theta_2 + y \sin \theta_2 \tag{5-2}$$

Straight line $L_3$ ($\theta_3$, $\rho_3$)

$$\rho_3 = x \cos \theta_3 + y \sin \theta_3 \tag{5-3}$$

According to these expressions, the rectangular characteristic calculating part 13 can calculate a plurality of equations of straight lines ($\theta_0$, $\rho_0$), ($\theta_1$, $\rho_1$), ($\theta_2$, $\rho_2$) and ($\theta_3$, $\rho_3$) of the region (that has not been determined as the rectangular region S).

Next, the rectangular characteristic calculating part 13 pairs this plurality of straight lines to satisfy the expressions of condition (6-1) or (6-2). On this occasion, one straight line can be paired with another more than once.

(Expressions 6-1, 6-2)
Condition 1:

$$|\rho_i - \rho_j| > \delta_\rho \text{ and } |\theta_i - \theta_j| < \delta_\theta \tag{6-1}$$

Condition 2:

$$|\rho_i + \rho_j| > \delta_\rho \text{ and } |\theta_i - \theta_j - \pi| < \delta_\theta \tag{6-2}$$

Provided i≠j

Herein, $\delta_\rho$ represents a threshold value for distance between two straight lines to be paired, and $\delta_\theta$ represents a threshold value for an angular difference of two straight lines to be paired. Although the threshold values $\delta_\rho$ and $\delta_\theta$ are arbitrary set vales, two straight lines whose inclinations are approximated but that are apart are paired by setting the threshold value $\delta_\rho$ at a great value to some extent and setting the threshold value $\delta_\theta$ at a small value to some extent. For example, the threshold value $\theta_\rho$=0.1 [radian] and the threshold value $\delta_\theta$ is set at approximately ¼ of the short side length of the image data produced by the manuscript reading part 103. Further, according to the inequality of condition 2 (6-2), because a manuscript placed with a great tilt is read, even if an intersection between a normal passing through the point of origin O and the straight line $L_0$ is in a negative region of the Y-axis, the straight lines $L_0$ and $L_1$ can be paired.

In addition, the rectangular characteristic calculating part 13 calculates a combination of two sets of paired straight lines (hereafter, referred to as "pairs") to satisfy the inequality of condition 3 (7) among the pairs. At this time, one set of pairs can be recombined using another set of pairs more than once.

(Expression 7)
Condition 3:

$$|\cos(\theta_{i,j} - \theta_{k,l})| < \delta_0 \tag{7}$$

However, $\delta_0$ is a sufficiently-small value, and for example, $\delta_0$=0.1.

Further, $\theta_{i,j}$ means an average of $\theta$ of one set of pairs, and this value can be calculated with the following expressions (8-1) and (8-2):

(Expressions 8-1, 8-2)

Pairs to satisfy Condition 1: (8-1)

$$\theta_{i,j} = \frac{\theta_i + \theta_j}{2}$$

Pairs to satisfy Condition 2: (8-2)

$$\theta_{i,j} = \frac{\theta_i + \theta_j - \pi}{2}$$

With these expressions, two sets of pairs that are mutually orthogonal are calculated, and pairing information can be produced.

With the processing, the rectangular region S (FIG. 3) where the vertical lines (straight lines) of the manuscript become a pair and the transverse lines (straight lines) of the manuscript become a pair is extracted. Then, the rectangular characteristic calculating part 13 performs the above-described processing on the edge extraction front image data Ef, and the rectangular characteristic information ($\theta_{f0}$, $\rho_{f0}$), ($\theta_{f1}$, $\rho_{f1}$), ($\theta_{f2}$, $\rho_{f2}$) and ($\theta_{f3}$, $\rho_{f3}$) of the front rectangular region Sf is calculated, and $P_{f01}$ indicating that ($\theta_{f0}$, $\rho_{f0}$) and ($\theta_{f1}$, $\rho_{f1}$) are paired, and $P_{f23}$ indicating that ($\theta_{f2}$, $\rho_{f2}$) and ($\theta_{f3}$, $\rho_{f3}$) are produced as pairing information. Further, the rectangular characteristic calculating part 13 performs the processing on the edge extraction back reversed image data Er; calculates rectangular characteristic information ($\theta_{r0}$, $\rho_{r0}$), ($\theta_{r1}$, $\rho_{r1}$), ($\theta_{r2}$, $\rho_{r2}$) and ($\theta_{r3}$, $\rho_{r3}$) of the back rectangular region Sr, and produces pairing information $P_{r10}$ and $P_{r23}$.

Further, the rectangular characteristic calculating part 13, in the case of not satisfying an inequality of condition 3 (condition not met), acquires a region of next greater area s (numerical expression (3)) and extracts the rectangular region S, or, continues the processing until there are no longer regions to be acquired.

(Error Message Display Process) Then, when there is no more region to be acquired, the image forming device 1 performs a process to display an error message, such as "There was a failure to read the manuscript", on the display unit 105.

(Position Adjustment Parameter Calculating Part 14) The position adjustment parameter calculating part 14 is a calculating part to acquire the rectangular characteristic information of the front side and the back side from the rectangular characteristic calculating part 13 and to calculate correction parameters, which are a distance for parallel shift (parallel shift parameters: tx and ty) and an angle of rotational transfer (rotational angle parameter tθ) to align the rectangular characteristic information of the front side ($\theta_{f0}$-$\theta_{f3}$, $\rho_{f0}$-$\rho_{f3}$) with the rectangular characteristic information of the back side ($\theta_{r0}$-$\theta_{r3}$, $\rho_{r0}$-$\rho_{r3}$). Then, the position adjustment parameter calculating part 14 outputs the correction parameter (tx, ty, tθ) to the image data correction part 15. The back rectangular region Sr shall be aligned with the front rectangular region Sf using these parallel shift parameters tx and ty and the rotation angle parameter tθ, by shifting in parallel at the parallel shift parameters tx and ty, and further rotational-transferring at the rotational angle parameter tθ.

The position adjustment parameter calculating part 14 performs processing to extract the parallel shift parameters tx and ty and the rotational angle parameter tθ as described below. The position adjustment parameter calculating part 14, first, from the rectangular characteristic circulating part 13, acquires the rectangular characteristic information ($\theta_{f0}$, $\rho_{f0}$), ($\theta_{f1}$, $\rho_{f1}$), ($\theta_{f2}$, $\rho_{f2}$) and ($\theta_{f3}$, $\rho_{f3}$) of the front rectangular region Sf and the pairing information $P_{f10}$ and $P_{f23}$, and further acquires the rectangular characteristic information ($\theta_{r0}$, $\rho_{r0}$), ($\theta_{r1}$, $\rho_{r1}$), ($\theta_{r2}$, $\rho_{r2}$) and ($\theta_{r3}$, $\rho_{r3}$) of the back rectangular region Sr and the pairing information $P_{r10}$ and $P_{r23}$.

(Process to Calculate Side Length) Then, the position adjustment parameter calculating part 14, first, calculates the length of each side of the front rectangular region Sf using the rectangular characteristic information of the front rectangular region Sf. The length of the side can be calculated from three straight lines. These three straight lines are two straight lines composing a set of pairs and one straight line out of another set of pairs. Referring to FIG. 3 again, for example, a straight line $L_{f0}$ and a straight line $L_{f1}$ composing one set of pairs and a line $L_{f2}$, which is one straight line out of another set of pairs, are selected, and a distance from an intersection ($x_{0,2}$, $y_{0,2}$) of the straight lines $L_{f0}$ and $L_{f2}$ and to an intersection ($x_{1,2}$, $y_{1,2}$) of the straight lines $L_{f1}$ and $L_{f2}$ is calculated as the side length on the straight line $L_{f2}$. The intersections are sections equivalent to four corners of the manuscript.

Herein, the intersection ($x_{0,2}$, $y_{0,2}$) of the straight lines $L_{f0}$ ($\theta_0$, $\rho_0$) and $L_{f2}$ ($\theta_2$, $\rho_2$) can be calculated with the expression (9).

(Expression 9)

$$\begin{cases} x_{0,2} = -\dfrac{\rho_0 \sin\theta_2 - \rho_2 \sin\theta_0}{\sin(\theta_0 - \theta_2)} \\ y_{0,2} = \dfrac{\rho_0 \cos\theta_2 - \rho_2 \cos\theta_0}{\cos(\theta_0 - \theta_2)} \end{cases} \quad (9)$$

Further, a distance (length of the side on the straight line $L_{f2}$) $d_{f2}$ between the two points ($x_{0,2}$, $y_{0,2}$) and ($x_{1,2}$, $y_{1,2}$) can be calculated with the expression (10).

(Expression 10)

$$d_{f2} = \sqrt{(x_{1,2} - x_{0,2})^2 + (y_{1,2} - y_{0,2})^2} \quad (10)$$

Lengths $d_{f0}$, $d_{f1}$, $d_{f2}$ and $d_{f3}$ of the sides on the straight lines $L_{f0}$, $L_{f1}$, $L_{f2}$ and $L_{f3}$ of the front rectangular region Sf are calculated by applying the calculation to the straight lines to the sides, respectively.

Further, the position adjustment parameter calculating part 14 also calculates lengths $d_{r0}$, $d_{r1}$, $d_{r2}$ and $d_{r3}$ of the sides on the straight lines $L_{r0}$, $L_{r1}$, $L_{r2}$ and $L_{r3}$ using the rectangular characteristic information of the back rectangular region Sr, respectively.

(Process to Relate Each Side) Then, the position adjustment parameter calculating part 14 performs processing to relate each side of the front rectangular region Sf to that of the back rectangular region Sr, respectively. The processing is performed using the following method: Herein, the position adjustment parameter calculating part 14 acquires the rectangular characteristic information ($\theta_{f0}$, $\rho_{f0}$), ($\theta_{f1}$, $\rho_{f1}$), ($\theta_{f2}$, $\rho_{f2}$) and ($\theta_{f3}$, $\rho_{f3}$) of the front rectangular region Sf and the pairing information $P_{f10}$ and $P_{f23}$, and further acquires the rectangular characteristic information ($\theta_{r0}$, $\rho_{r0}$), ($\theta_{r1}$, $\rho_{r1}$), ($\theta_{r2}$, $\rho_{r2}$) and ($\theta_{r3}$, $\rho_{r3}$) of the back rectangular region Sr and the pairing information $P_{r10}$ and $P_{r23}$. Herein, the pairing information $P_{f10}$ indicates the rectangular characteristic information ($\theta_{f0}$, $\rho_{f0}$) and the rectangular characteristic information ($\theta_{f1}$, $\rho_{f1}$) are the pairs; $P_{f23}$ indicates the rectangular characteristic information ($\theta_{f2}$, $\rho_{f2}$) and the rectangular characteristic information ($\theta_{f3}$, $\rho_{f3}$) are the pairs; $P_{r10}$ indicates the rectangular characteristic information ($\theta_{r0}$, $\rho_{r0}$) and the rectangular characteristic information ($\theta_{r1}$, $\rho_{r1}$) are the pairs; and $P_{r23}$ indicates the rectangular characteristic information ($\theta_{r2}$, $\rho_{r2}$) and the rectangular characteristic information ($\theta_{r3}$, $\rho_{r3}$) are the pairs.

First, the position adjustment parameter calculating part 14 calculates average θ of two straight lines in each pair. Herein, the average θ ($\theta_{pf01}$) of the pair $P_{f01}$ can be calculated with the expression (11).

(Expression 11)

$$\theta_{Pf01} = \frac{\theta_{f0} + \theta_{f1}}{2} \quad (11)$$

Thus, the position adjustment parameter calculating part 14 calculates $\theta_{Pf01}$ of the pair $P_{f01}$ and $\theta_{Pf23}$ of the pair $P_{f23}$ in the front rectangular region Sf, and $\theta_{Pb01}$ of the pair $P_{r01}$ and $\theta_{pb23}$ of the pair $P_{r23}$ of the back rectangular region Sr.

Then, the position adjustment parameter calculating part 14 performs processing to relate $\theta_{Pf01}$ and $\theta_{Pf23}$ of the front rectangular region Sf to the approximating $\theta_{Pb01}$ and $\theta_{Pb23}$ of the back rectangular region Sr. The processing is performed as follows: If $|\theta_{Pf01} - \theta_{Pb01}| < |\theta_{Pf01} - \theta_{Pf23}|$, the pair $P_{f01}$ is related to the pair $P_{r01}$ (i.e., $\theta_{Pf01}$ is not equal to $\theta_{Pb01}$). In the meantime, the inequality is not satisfied, the pair $P_{f01}$ is related to the pair $P_{r23}$ (i.e., $\theta_{Pf01}$ is not equal to $\theta_{Pf23}$). Then, the pair $P_{r23}$ relates to a pair that is not related. Herein, the pair $P_{f01}$ is related to the pair $P_{r01}$, and the pair $P_{f23}$ is related to the pair $P_{r23}$.

Next, the position adjustment parameter calculating part 14, based upon the distance ρ of each side to the point of origin O, performs processing to relate one side to another whose distances ρ are approximate per related pairs. For example, in the case that the pair $P_{f01}$ relates to the pair $P_{b01}$, processing to relate $\rho_{f0}$ of the straight line $L_{f0}$ and $\rho_{f1}$ of the straight line $L_{f1}$ in the front rectangular region Sf to approximate $\rho_{r0}$ of the straight line $L_{r0}$ and $\rho_{r1}$ of the straight line $L_{r1}$ in the back rectangular region Sr is performed. The processing is performed as follows: If $|\rho_{f0} - \rho_{r0}| < |\rho_{f1} - \rho_{r1}|$, the side on the straight line $L_{f0}$ is related to that on $L_{r0}$ (i.e., $\rho_{f0}$ is not equal to $\rho_{r0}$). In the meantime, the inequality is not satisfied, the side on the straight line $L_{f0}$ is related to that on the straight line $L_{r1}$ (i.e., $\rho_{f0}$ is not equal to $\rho_{r1}$). Then, the side on the straight line $L_{f1}$ is related to a pair that is not related. According to the relating processing, the position adjustment parameter calculating part 14 can relates each side of the front rectangular region Sf to each side of the back rectangular region Sr, respectively.

According to such processing, it is assumed that the side on the straight line $L_{f0}$ is related to that on the straight line $L_{r0}$; the side on the straight line $L_{f1}$ is related to that on the straight line $L_{r1}$, the side on the straight line $L_{f2}$ is related to that on the straight line $L_{r3}$; and the side on the straight line $L_{f3}$ is related to that on the straight line $L_{r2}$.

(Processing to Determine Aligning Related Sides) Next, the position adjustment parameter calculating par 14 calculates a difference between the lengths of the related sides on the front and back sides, whether or not the difference is smaller than a predetermined value. In other words, whether or not the size of the manuscript (the front rectangular region Sf and the back rectangular region Sr) is matched is determined. As a result of calculating a difference between the length $d_{f0}$ on the straight line $L_{f0}$ and the length $d_{r0}$ on the straight line $L_{r0}$, if the difference is smaller than a predetermined value (i.e., $d_{f0}$ is nearly equal to $d_{r0}$), it is determined that the side on the straight line $L_{f0}$ relates to the side on the straight line $L_{r0}$. Then, the position adjustment parameter calculating part 14 performs such determination process between the length $d_{f1}$ on the straight line $L_{f1}$ and the length $d_{r1}$ on the straight line $L_{r1}$; between the length $d_{f2}$ on the straight line $L_{f2}$ and the length $d_{r2}$ on the straight line $L_{r2}$; and between the length $d_{f3}$ on the straight line $L_{f3}$ and the length $d_{r3}$ on the straight line $L_{r3}$.

Then, if determining that the differences between the lengths of related sides on the front side and on the back side are all smaller than a predetermined value, i.e., the sizes of the manuscript (the front rectangular region Sf and the back rectangular region Sr) are matched, the position adjustment parameter calculating part 14 performs a process to adjust positions to be described below. The predetermined value is acceptable as long as an error value occurring due to the processing by the position adjustment parameter calculating part 14 from the image data acquiring part 11 is considered.

(Process to Display Error Message) In the meantime, as a result of calculating a difference between the length $d_{f0}$ on the straight line $L_{f0}$ and the length $d_{r0}$ on the straight line $L_{r0}$, if the difference is greater than the predetermined value, it is believed that the sizes are difference between the front side and the back side of the read manuscript. For example, this corresponds to a case where a manuscript read as a front side is B5 size and a manuscript read as a back side is A4 size. On this occasion, the image forming device 1 performs a process to allow the display unit 105 to display an error message, such as "The size of the manuscript differs between the front side and the back side."

Next, the position adjustment parameter calculating part 14 performs a process to adjust positions as described below.

(Processing to Adjust Positions) First, the position adjustment parameter calculating part 14 calculates a rotational angle parameter $t\theta_f$ for correcting image data on the front side (front image data Df) and a rotational angle parameter $t\theta_b$ for correcting image data on the back side (back reversed image data Dr), based upon the average θ of the front rectangular region Sf and the average θ of the back rectangular region Sr.

(Processing to Adjust Positions: Correction Pattern to Align Image Data on Back Side with Image Data on Front Side) When the position adjustment parameter calculating part 14 corrects to align the image data on the back side with that on the front side, $t\theta_f = 0$, and $t\theta_b$ can be calculated with the expression (12).

(Expression 12)

$$t\theta_b = \frac{(\theta_{Pf01} + \theta_{Pf23})}{2} - \frac{(\theta_{Pb01} + \theta_{Pb23})}{2} \quad (12)$$

Next, the position adjustment parameter calculating part 14 obtains parallel shift parameters $tx_f$ and $ty_f$ for correcting the image data on the front side (front image data Df) and parallel shift parameters $tx_b$ and $ty_b$ for correcting the image data on the back side (back reversed image data Dr). The intersection is an intersection $(x_{0,2}, y_{0,2})$ of the extracted straight line $L_{f0}$ and the straight line $L_{f2}$ or an intersection $(x_{1,2}, y_{1,2})$ of the extracted straight line $L_{f1}$ and the straight line $L_{f2}$ on the occasion of the processing to calculate the length of sides (the processing to calculate the length of sides of the rectangular region).

First, any one of intersections is selected. As a method to select one intersection, any method to select only one of intersection, which can be an intersection whose distance from a point of origin is the smallest, or which can be an intersection whose x-axis coordinate value is the greatest, is acceptable. Coordinate values of the selected intersection in the front image data Df are set at $(x_{f0}, y_{f0})$, and coordinate values of an intersection in the back reversed image data Dr relating to the above intersection are set at $(x_{b0}, y_{b0})$. The related intersection can be acquired from an intersection of two sets of sides (straight lines) related on the front side and the back side. Then, each intersection is rotated and transformed with the expressions (13-1) and (13-2) using the coordinates of these intersections and the rotational angle parameters $t\theta_f$ and $t\theta_b$.

(Expressions 13-1, 13-2)

$$\begin{cases} X_{f0} = x_{f0}\cos t\theta_f - y_{f0}\sin t\theta_f \\ Y_{f0} = x_{f0}\sin t\theta_f + y_{f0}\cos t\theta_f \end{cases} \quad (13\text{-}1)$$

$$\begin{cases} X_{b0} = x_{b0}\cos t\theta_b - y_{b0}\sin t\theta_b \\ Y_{b0} = x_{b0}\sin t\theta_b - y_{b0}\cos t\theta_b \end{cases} \quad (13\text{-}2)$$

Next, the parallel shift parameters $tx_f$, $ty_f$, $tx_b$ and $ty_b$ for parallel shift correction so as to have the intersections after this rotational transfer matching on the front side and the back side are calculated. Herein, when the position adjustment parameter calculating part 14 corrects to the image data on the back side to be aligned with that on the front side, $tx_f=ty_f=0$, and $tx_b$ and $ty_b$ can be calculated with the expression (14).

(Expression 14)

$$\begin{cases} tx_b = X_{f0} - X_{b0} \\ ty_b = Y_{f0} - Y_{b0} \end{cases} \quad (14)$$

Thus, the position adjustment parameter calculating part 14 outputs the correction parameters $(tx_f, ty_f, t\theta_f)$ and $(tx_b, ty_b, t\theta_b)$ to the image data correction part 15. Herein, when correcting to align the image data on the back side with that on the front side, the position adjustment parameter calculating part 14 outputs the correction parameters (0, 0, 0) and $(tx_b, ty_b, t\theta_b)$ to the image data correction part 15.

The pattern where the position adjustment parameter calculating part 14 corrects the image data on the back side to match with that on the front side was described above, and as another position adjustment processing, a pattern where the image data on the front side is corrected to align with that on the back side, and another pattern where a rectangular region S of the manuscript is corrected so as to face the front with regard to the two-dimensional plane coordinate axis are available.

(Processing to Adjust Positions: Correction Pattern to Align Image Data on Front Side With That on Back Side) When the position adjustment parameter calculating part 14 corrects the image data on the front side to align with that on the back side, $t\theta_b=0$, and $t\theta_f$ can be calculated using the expression (15) instead of the expression (12).

(Expression 15)

$$t\theta_f = \frac{(\theta_{Pb01} + \theta_{Pb23})}{2} - \frac{(\theta_{Pf01} + \theta_{Pf23})}{2} \quad (15)$$

Further, when the parallel shift parameters $tx_f$, $ty_f$, $tx_b$ and $ty_b$ are circulated, $tx_b=ty_b=0$, and $tx_f$ and $ty_f$ can be calculated using the expression (16) instead of the expression (14).

(Expression 16)

$$\begin{cases} tx_f = X_{b0} - X_{f0} \\ ty_f = Y_{b0} - Y_{f0} \end{cases} \quad (16)$$

(Processing to Adjust Positions: Correction Pattern to Face the Front of Rectangular Region of Manuscript with Regard to Two-Dimensional Plane Coordinate Axis) Further, when the position adjustment parameter calculating part 14 corrects both image data on the front side and that on the back side so as to face the front of the rectangular region S of the manuscript with regard to the two-dimensional plane coordinate axis, they can be calculated using the expressions (17-1) and (17-2) instead of the expression (12).

(Expressions 17-1, 17-2)

$$t\theta_f = \begin{cases} -\theta_{Pf01} & (\theta_{Pf01} < \theta_{Pf23}) \\ -\theta_{Pf23} & (\text{else}) \end{cases} \quad (17\text{-}1)$$

$$t\theta_b = \begin{cases} -\theta_{Pb01} & (\theta_{Pb01} < \theta_{Pb23}) \\ -\theta_{Pb23} & (\text{else}) \end{cases} \quad (17\text{-}2)$$

Further, when the parallel shift parameters $tx_f$, $ty_f$, $tx_b$ and $ty_b$ are calculated, $tx_f$ and $ty_f$ can be calculated using the expression (18) instead of the expression (14).

(Expression 18)

$$\begin{cases} tx_f = -X_{f0} + \alpha \\ ty_f = -Y_{f0} + \beta \\ tx_b = -X_{b0} + \alpha \\ ty_b = -Y_{b0} + \beta \end{cases} \quad (18)$$

(Image Data Correction part 15) The image data correction part 15 acquires the correction parameters $(tx_f, ty_f, t\theta_f)$ and $(tx_b, ty_b, t\theta_b)$ from the position adjustment parameter calculating part 14, and acquires the front image data Df and the back reversed image data Dr from the memory part 20. Then, the image data correction part 15 rotational-transfer the front image data Df at the rotational angle parameter $t\theta_f$; further shifts only at the parallel shift parameters $tx_f$ and $ty_f$ in parallel; produces reversed front correction image data DXf based upon the reverse direction information, and stores the data in the memory part 20. In addition, the image data correction part 15 rotational-transfers the back reversed image data Dr at the rotational angle parameter $t\theta$; further shifts the data by the parallel shift parameters tx and ty in parallel; based upon the reverse direction information, produces reversed back correction image data DXb; and stores the data in the memory part 20.

(Processing to Adjust Positions: Correction Pattern to Align Image Data on the Back Side with Image Data on the Front Side) Herein, when the position adjustment parameter calculating part 14 corrects to align the image data on the back side with that on the front side, the image data correction part 15 acquires the correction parameters (0, 0, 0) and $(tx_b, ty_b, t\theta_b)$ from the position adjustment parameter calculating part 14. In addition, the image data correction part 15 acquires the front image data Df and the back reversed image data Dr from the memory part 20; rotational-transfers the back reversed image data Dr at the rotational angle parameter tθ; further shifts the back reversed image data Dr at the parallel shift parameters $tx_b$ and $ty_b$ in parallel; produces reversed back correction image data DXb based upon the reverse direction information; and stores that image data in the memory part 20.

Furthermore, the image processing part 10 is composed of a common computer having a not-illustrated central processing unit (CPU), read-only-memory (ROM), random-access-memory (RAM), hard disc (HD), etc., and can be activated by a program to make the computer function as each means mentioned above.

(Print Execution Processing Part 201) A Print execution processing part 201 acquires the front correction image data DXf and the back correction image data DXb from the memory part 20, and controls a not-illustrated photoreceptor, a carrying roller and a sheet feeding part, etc., which are provided by a printing part 200, and print (the data) on a medium, such as paper. Herein, because no front correction image data DXf is produced by the image data correction part 15, when the front correction image data DXf is not stored in the memory part 20, the print execution processing part 201 acquires the front image data Df instead of the front correction image data DXf.

In the image forming device 1 of the first embodiment having the configuration, a user allows a scanner, etc. to read a manuscript (rectangular medium) and merely enters first image data including the shape of the manuscript on the front side and second image data including the shape of the manuscript on the back side produced by the scanner into the image processing part 10, and then can provide image data (the front correction image data DXf and the back correction image data DXb) where the shape of the manuscript on the front side contained in the first image data and the shape of the manuscript on the back side contained in the second image data are aligned. Consequently, because the user can avoid his/her trouble to manually adjust positions of the image, working hours can be drastically reduced. Further, when the front correction image data DXf is printed onto the front side of an output medium and the back correction image data DXb is printed on the back side of the output medium, printing with matched four corners can be performed.

Figure 4:
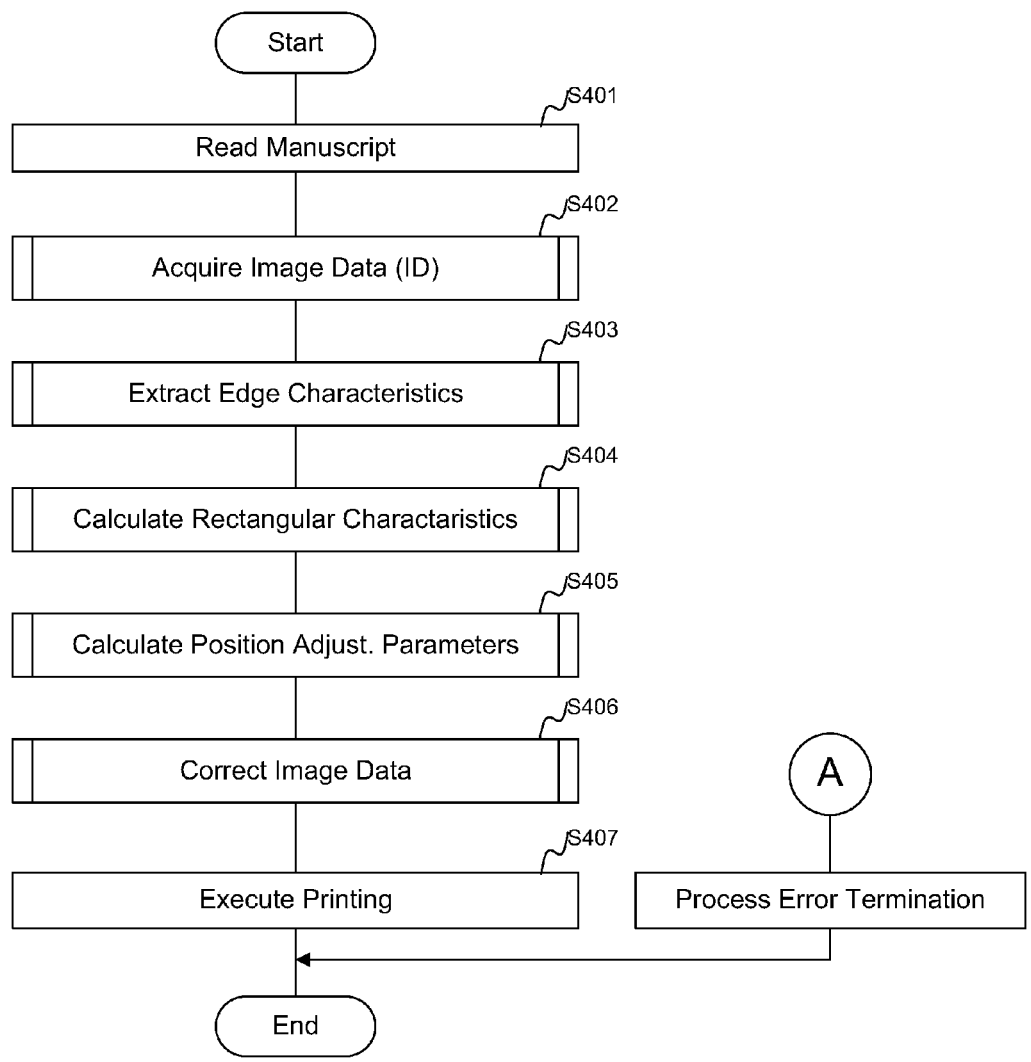
FIG. 4 is a flow diagram of two-sided printing processing of the image forming device in the first embodiment.

(Processing of Image Forming Device) Next, with reference to FIG. 4, the processing of the image forming device 1 is explained (accordingly see FIG. 1 or FIG. 3). Herein, a manuscript with printed both sides shall be read.

First, the image forming device 1 (manuscript reading part 103) performs the processing to read an image (S401).

(Processing to Read Manuscript: S401) A user U places a manuscript on the platen 101 of the scanner part 100, and while viewing the display unit 105, he/she operates the operating part 104, and allows the manuscript reading part 103 to read the front side of the manuscript. Next, the user U flips the manuscript on the platen 101 (reverse horizontal) and places it (reverse direction information="reverse horizontal"), and operates the operating part 104, and allows the manuscript reading part 103 to read the back side of the manuscript. According to the operation by the user U, the manuscript reading part 103 reads the front side and the back side of the manuscript, respectively, and produces two image data, and in addition, acquires front/back information indicating whether the image data is the front side or the back side of the manuscript. Then, the manuscript reading part 103 outputs the read image data and front/back information to the image data acquiring part 11.

Next, the image forming device 1 performs the processing to acquire image data (S402).

Figure 5:
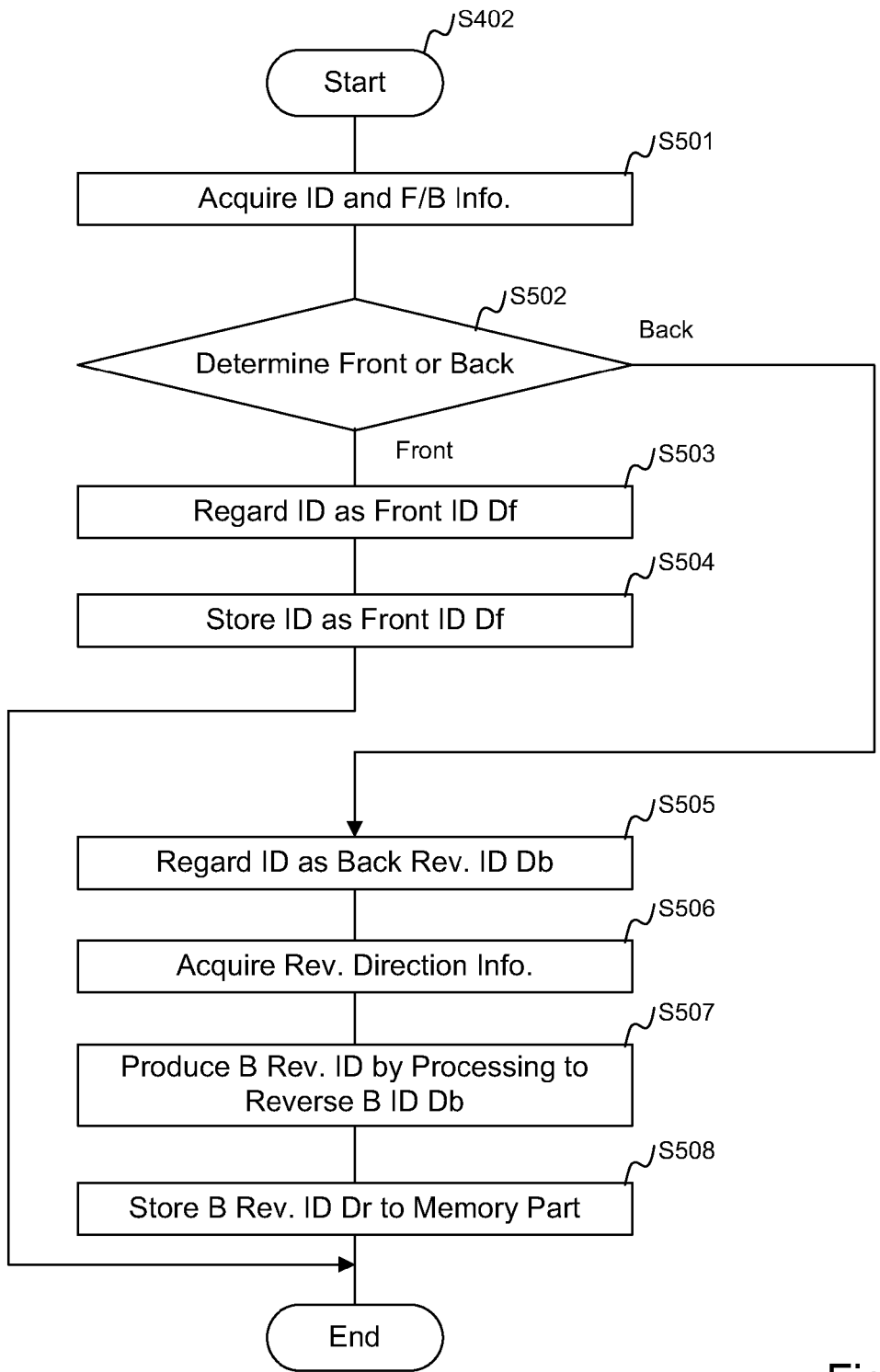
FIG. 5 is a flow diagram of manuscript reading processing.

(Processing to Acquire Image Data: S402) FIG. 5 is a flow diagram of the processing to acquire the image data. The image data acquiring part 11 acquires the image data and the front/back information from the manuscript reading part 103 (S501). Then, the image data acquiring part 11 determines whether the acquired image data is for front or back based on the front/back information (S502). If the front/back information indicates "front" (S502, front), the image data acquiring part 11 stores the acquired image data as the front image data Df (S503) to the memory part 20 (S504). Then, the image forming device 1 performs the processing to extract edge characteristics (S403, FIG. 4).

If the front/back information indicates "back" (S502, back), the image data acquiring part 11 regards the acquired image data as the back image data Db (S505), and next, the image data acquiring part 11 acquires the reverse direction information pre-stored by the image processing part 10 (S506) and performs the processing to reverse the back image data Db, and produces the back reversed image data Dr where the back image data Db is reversed toward the (S507). Then, the image data acquiring part 11 stores the back reversed image data Dr to the memory part 20 (S508).

Next, the image forming device 1 performs the process to extract an edge characteristic (S403, FIG. 4).

Figure 6:
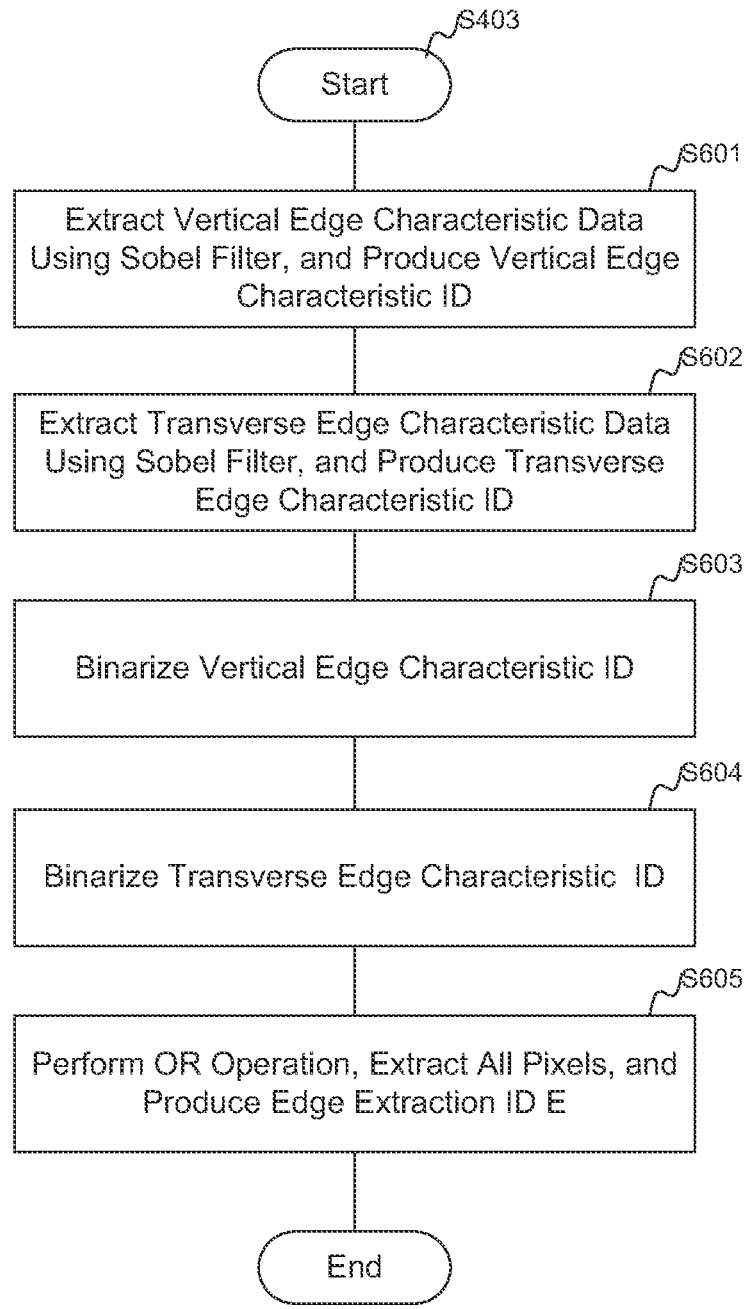
FIG. 6 is a flow diagram of edge characteristic extraction processing.

(Processing to Extract Edge Characteristics: S403) FIG. 6 is a flow diagram of the processing to extract edge characteristics. Herein, an example of performing the processing to extract edge characteristics to the image data on the front side (front image data Df) is shown. The edge characteristic extracting part 12 acquires the front image data Df from the memory part 20; extracts vertical edge characteristic data from the front image data Df using the Sobel filter (matrix of coefficients for vertical line detection); and produces the vertical edge characteristic image data (S601).

Further, the edge characteristic extracting part 12 extracts transverse edge characteristic data from the front image data Df using the Sobel filter (matrix of coefficients for transverse line detection), and produces the transverse edge characteristic image data (S602). Then, the edge characteristic extracting part 12 binarizes the vertical edge characteristic image data (S603). Further, the edge characteristic extracting part 12 similarly binarizes the transverse edge characteristic image data (S604). Then, the edge characteristic extracting part 12 performs OR operation of two binarized image data (vertical edge characteristic image data and transverse edge characteristic image data); extracts all pixels corresponding to the edges; and produces edge extraction image data E (edge extraction front image data Ef) (S605). Further, the edge characteristic extracting part 12 similarly performs the processing to extract the edge characteristics from the image data on the back side (back reversed image data Dr) (S601-S605), and produces the edge extraction back reversed image data Er.

Next, the image forming device 1 performs the processing to calculate rectangular characteristics (S404, FIG. 4).

Figure 7:
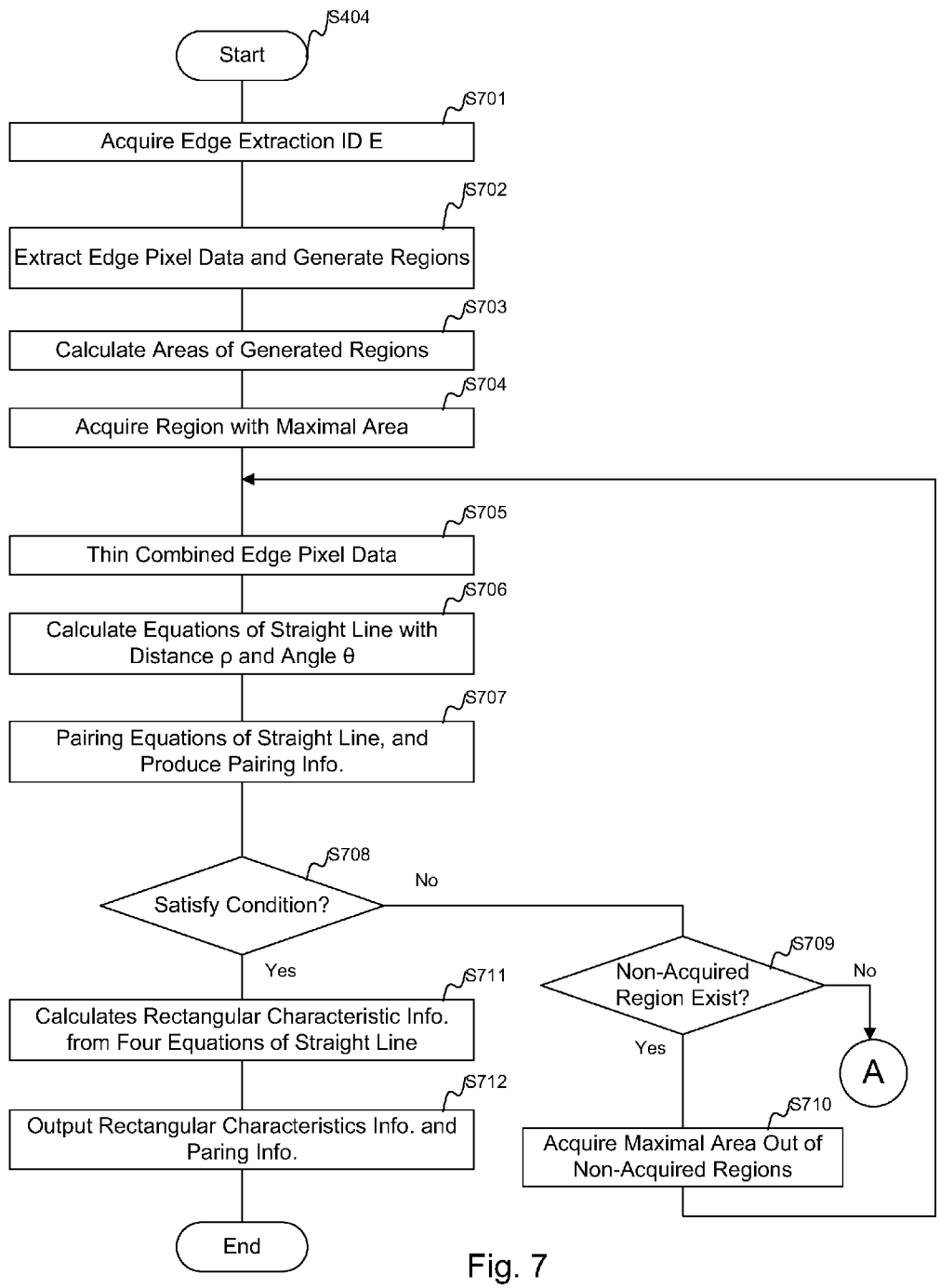
FIG. 7 is a flow diagram of rectangular characteristic calculation processing.

(Processing to Calculate Rectangular Characteristics: S404) FIG. 7 is a flow diagram of the processing to calculate rectangular characteristics. Herein, an example of performing the processing to calculate the rectangular characteristics to the image data on the front side (edge extraction front image data Ef) is shown. The rectangular characteristic calculating part 13 acquires the edge extraction image data E (edge extraction front image data Ef) from the edge characteristic extracting part 12 (S701). Then, the rectangular characteristic calculating part 13 extracts and combines the edge pixel data contained in the edge extraction front image data Ef, and generates regions (S702). The rectangular characteristic calculating part 13 calculates an area of the generated regions, respectively (S703), and acquires a region with a maximal area (S704).

The rectangular characteristic calculating part 13 performs the processing to thin the combined edge pixel data (S705). The rectangular characteristic calculating part 13 calculates equations (L, (θ, ρ)) of a straight line with the distance ρ to the point of origin O and the angle θ formed by the point of origin O (S706). The rectangular characteristic calculating part 13 performs the pairing to the equations of a straight line so as to satisfy to the expression of condition 1 (expression (6-1) or the expression of condition 2 (expression (6-2)), respectively, and produces pairing information (S707). Then, the rectangular characteristic calculating part 13 determines a condition about whether or not condition 3 (expression (7)) is satisfied.

When the condition is not satisfied (S708, not satisfied), whether or not there are any non-acquired regions out of the regions generated at S702 (S709), and if there are non-acquired region(s) (S709, Yes), a region with a maximal area out of the not-acquired regions is acquired (S710). If there is no non-acquired region (S709, None), the error termination processing is performed (S408, FIG. 4), and the image forming device 1 allows the display unit 105 to display an error message, and terminates the process. This error is caused, for example, by extracting an edge that could not be paired by the edge characteristic extracting part 12 because the manuscript is folded, or a portion of the manuscript is missing.

Further, when the condition is satisfied at the determination for the condition of S708 (S708, satisfied), the rectangular characteristic calculating part 13 calculates rectangular characteristic information from four equations of straight line forming the regions $(\theta_{f0}, \rho_{f0})$, $(\theta_{f1}, \rho_{f1})$, $(\theta_{f2}, \rho_{f2})$ and $(\theta_{f3}, \rho_{f3})$ (S711). Then, the rectangular characteristic calculating part 13 outputs the rectangular characteristic information and the pairing information (S712).

Further, the rectangular characteristic calculating part 13 similarly performs the processing to calculate the rectangular characteristic (S701-S712) for the image data on the back side (edge extraction back reversed image data Er), and produces the rectangular characteristic information and pairing information.

Next, the image forming device 1 performs the processing to calculate position adjustment parameters (S405, FIG. 4).

Figure 8:
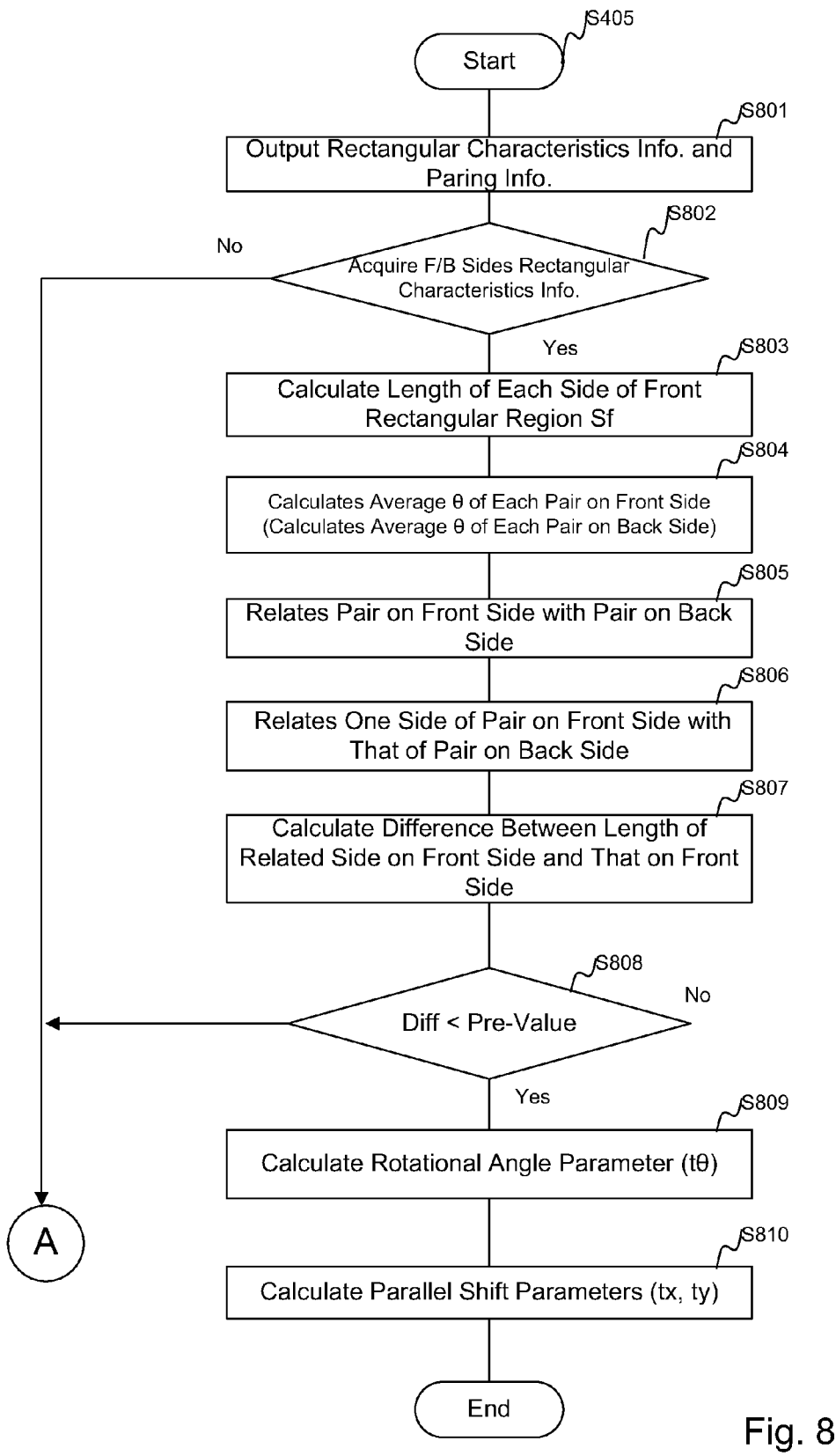
FIG. 8 is a flow diagram of position adjustment parameter calculation processing.

(Processing to Calculate Position Adjustment Parameters: S405) FIG. 8 is a flow diagram of the processing to calculate the position adjustment parameters. The position adjustment parameter calculating part 14 acquires the rectangular characteristic information and the pairing information (S801). The position adjustment parameter calculating part 14 determines whether or not the rectangular characteristic information on the front side and on the back side has been able to be acquired (S802). If the rectangular characteristic information on the front side and on the back side cannot be acquired (S802, No), the error termination processing is performed (S408, FIG. 4), and the image forming device 1 allows the display unit 105 to display an error message and terminates the processing.

In the meantime, if the rectangular characteristic information on the front side and the back side can be acquired (S802, Yes), the position adjustment parameter calculating part 14 calculates the length of each side of the front rectangular region Sf on the front side (S803). Similarly, the position adjustment parameter calculating part 14 also calculates the length of each side of the back rectangular region Sb on the back side. Next, the position adjustment parameter calculating part 14 calculates average A of each pair on the front side (S804). Similarly, the position adjustment parameter calculating part 14 also calculates average θ of each pair on the back side. Then, the position adjustment parameter calculating part 14 relates the pair on the front side with the pair on the back side (S805), and further relates one side of the pair on the front side with that of the pair on the back side (S806). Then, the position adjustment parameter calculating part 14 calculates a difference between length of the related side on the front side and that on the back side (S807).

Herein, the position adjustment parameter calculating part 14 determines whether or not the difference value is smaller than a predetermined value (S808). When the difference value is greater than the predetermined value (S808, No), an error termination processing is performed (S408, FIG. 4), and the image forming device 1 allows the display unit 105 to display an error message and terminates the processing. In the meantime, when the difference value is smaller than the predetermined value (S808, Yes), the position adjustment parameter calculating part 14 calculates a rotational angle parameter (S809), and next, calculates parallel shift parameters (S809).

Next, the image forming device 1 performs the processing to correct image data (S406, FIG. 4).

Figure 9:
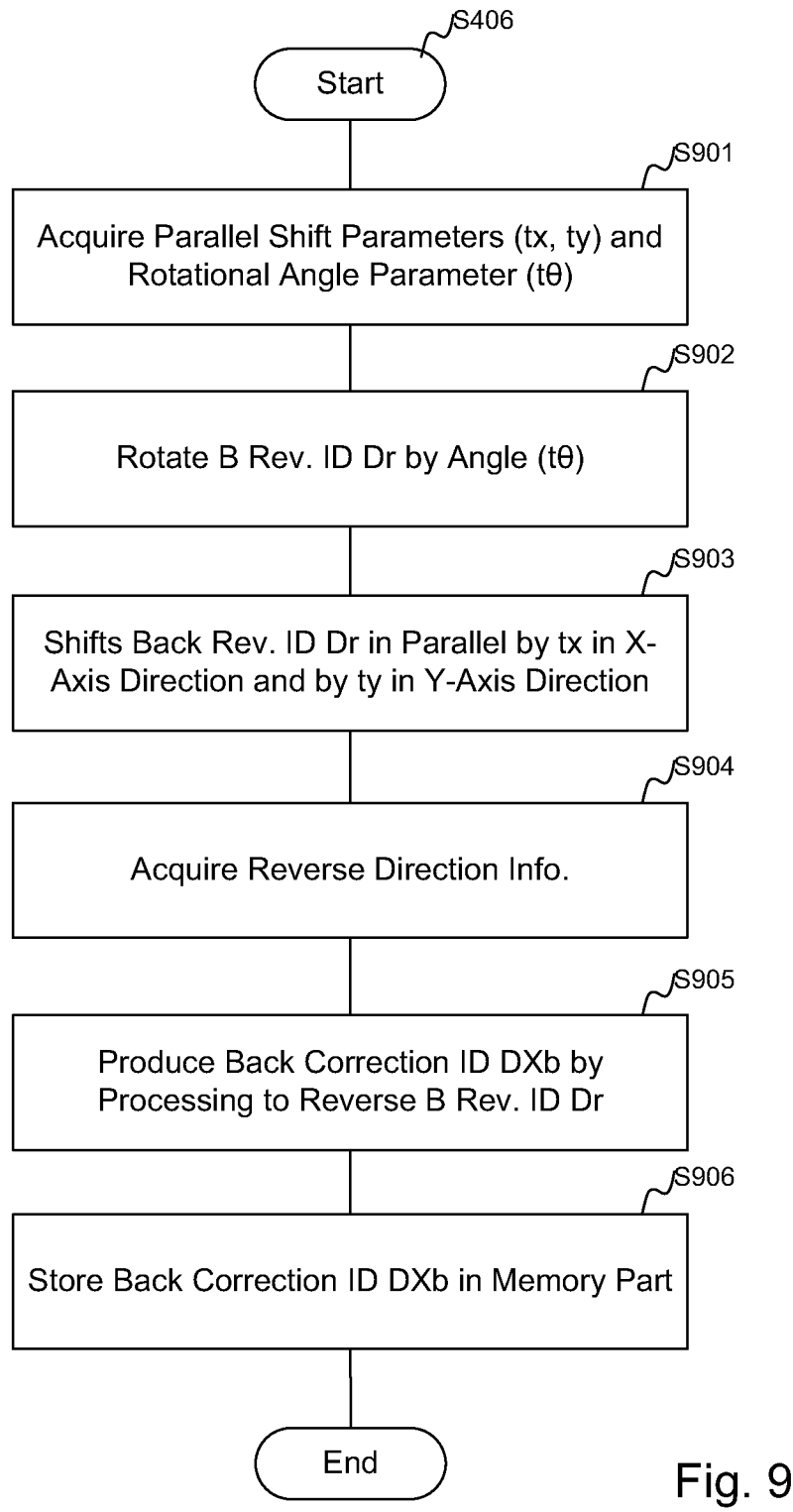
FIG. 9 is a flow diagram of image data correction processing.

(Processing to Correct Image Data: S406) FIG. 9 is a flow diagram of the processing to correct the image data. First, the image data correction part 15 acquires the parallel shift parameters (tx, ty) and the rotational angle parameter (tθ) from the position adjustment parameter calculating part 14 (S901). Then, the image data correction part 15 rotates the back reversed image data Dr only by the rotational angle parameter tθ (S902). Next, the image data correction part 15 shifts the back reversed image data Dr in parallel by tx in the X-axis direction and by ty in the Y-axis direction (S903).

Then, the image data correction part 15 acquires the reverse direction information pre-stored by the image processing part 10 (S904); performs the reverse processing on the back reversed image data Dr; and produces the back correction image data DXb where the back reversed image data Dr is reversed (a reverse processing) toward the direction according to the reverse direction information (S905). Then, the image data correction part 15 stores the back correction image data DXb in the memory part 20 (S906).

Next, the image forming device 1 performs a processing to execute printing (S407, FIG. 4).

(Processing to Execute Printing: S407) The print execution processing part 201 acquires the front correction image data DXf and the back correction image data DXb from the memory part 20, and further acquires setting information relating to printing from the memory part 20, and in the case of the "two-side printing," the front correction image data DXf is printed on one side (front side) of an output medium (paper) and the back correction image data DXb is printed on the back side. In the meantime, in the case of "one-side printing," the front correction image data DXf is printed on one side (front side) of the output medium (paper), and the back correction image data DXb is printed on the same side. Herein, since the front correction image data DXf is not produced by the image data correction part 15, if the front correction image data DXf is not stored in the memory part 20, the print execution processing part 201 acquires the front image data Df instead of the image correction image data DXf.

Second Embodiment

Figure 10:
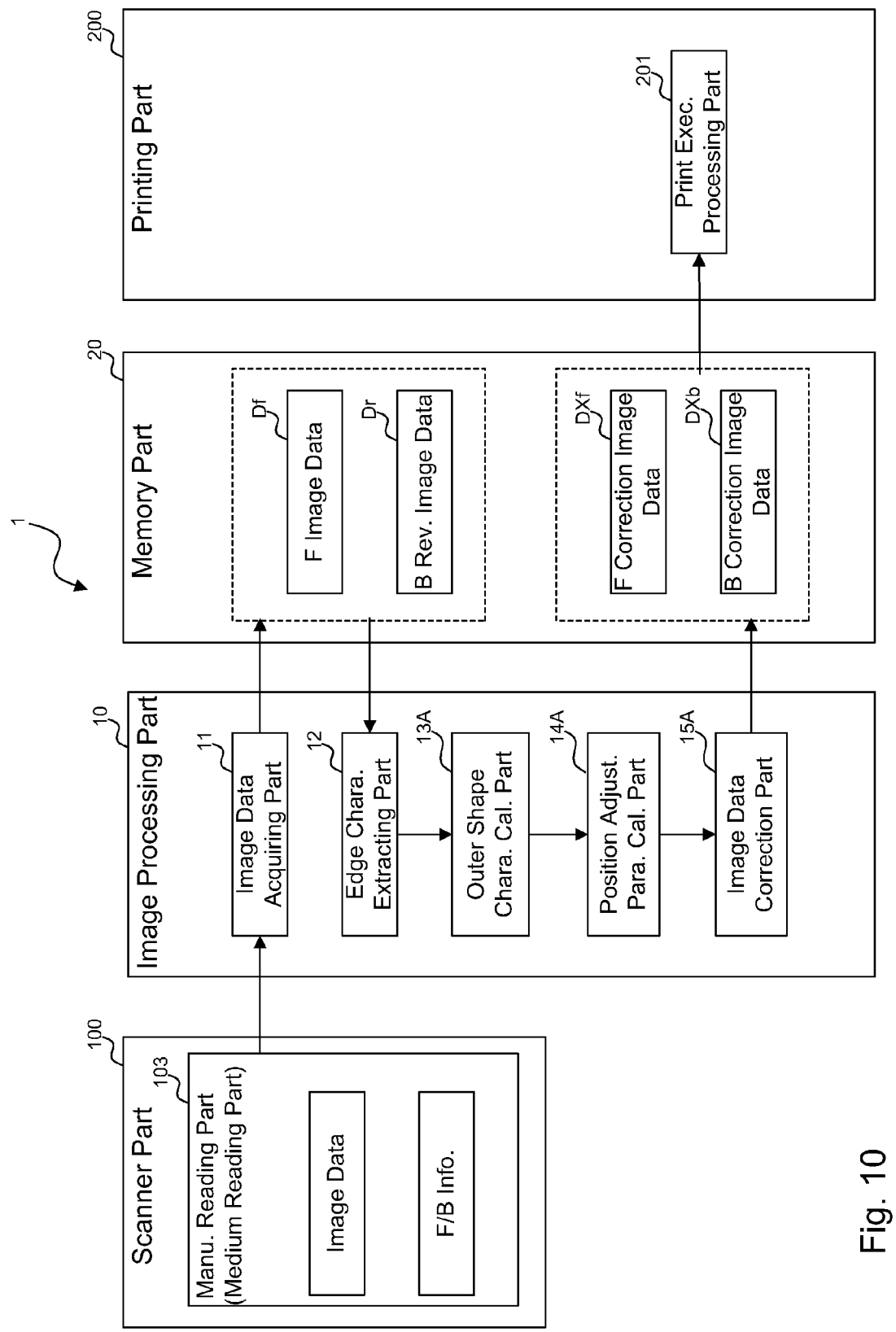
FIG. 10 is a block diagram illustrating a configuration of the image forming device equipped with an image processing device in a second embodiment.

An image forming device 1A of a second embodiment is a device, as illustrated in FIG. 10, having an outer shape characteristic calculating part 13A, a position adjustment parameter calculating part 14A and an image data correction part 15A instead of the rectangular characteristic calculating part 13, which is provided by the image forming device 1 of the first embodiment (FIG. 2), the position adjustment parameter calculating part 14 and the image data correction part 15.

(Outer Shape Characteristic Calculating Part 13A) The outer shape characteristic calculating part 13A has substantially the same configuration as the rectangular characteristic calculating part 13, and has the configuration enabling to perform the processing up to S705 (FIG. 7), and performs to thin a row (line) where edge pixels forming a region are combined and extracts all outer shape characteristic information (a region surrounded by the thinning-processed lines) to be edges of the region (outer circumference).

(Position Adjustment Parameter Calculating Part 14A) The position adjustment parameter calculating part 14A is a calculating part to calculate coordinates of the center of gravity in the outer form characteristic information on the front side and on the back side extracted by the outer shape characteristic calculating part 13A, and to calculate correction parameters, which are distance to shift in parallel (parallel shift parameters tx, ty) and an angle to rotational-transfer (rotational angle parameter tθ) to correspond coordinate value of the center of gravity on the front side and coordinate value of the center of gravity on the back side. Then, the position adjustment parameter calculating part 14A outputs the correction parameters (tx, ty, tθ) to the image data correction part 15A.

Using these parallel shift parameters tx and ty and the rotational angle parameter tθ, the outer shape characteristic information on the back side is shifted in parallel at the parallel shift parameters tx and ty, and is rotational-transferred at the rotational angle parameter tθ, and the outer shape characteristic information on the back side shall be matched with that on the front side. The position adjustment parameter calculating part 14A sets the number of pieces of outer shape characteristic information on the front side and a coordinate value acquired from the outer shape characteristic calculating part 13A at M and $(x_{fi}, y_{fi})$, i=1, . . . , M, respectively, and sets the number of pieces of outer shape characteristic information on the back side and a coordinate value acquired from the outer shape characteristic calculating part 13A at N and $(x_{bj}, y_{bj})$, j=1, . . . , N, respectively. On this occasion, coordinates $(x_{fg}, y_{fg})$ of center of gravity in the outer shape characteristic information on the front side (front image data Df) and coordinates $(x_{bg}, y_{bg})$ of center of gravity in the outer shape characteristic information on the back side (back reversed image data Dr) are calculated using the expressions (19-1) and (19-2).

(Expressions 19-1, 19-2)

$$\begin{cases} x_{fg} = \frac{1}{M}\sum_{i=1}^{M} x_{fi} \\ y_{fg} = \frac{1}{M}\sum_{i=1}^{M} y_{fi} \end{cases} \quad (19\text{-}1)$$

$$\begin{cases} x_{bg} = \frac{1}{N}\sum_{i=1}^{N} x_{bi} \\ y_{bg} = \frac{1}{N}\sum_{i=1}^{N} y_{bi} \end{cases} \quad (19\text{-}2)$$

The position adjustment parameter calculating part 14A shifts the outer shape characteristic information in parallel using the expressions (20-1) and (20-2) so as to position the coordinates of the center of gravity on the front side and the back side at the point of origin in the two-dimensional plane coordinates.

(Expressions 20-1, 20-2)

$$\begin{cases} X_{fi} = x_{fi} - x_{fg} \\ Y_{fi} = y_{fi} - y_{fg} \end{cases} \quad (20\text{-}1)$$

$$\begin{cases} X_{bi} = x_{bi} - x_{bg} \\ Y_{bi} = y_{bi} - y_{bg} \end{cases} \quad (20\text{-}2)$$

The position adjustment parameter calculating part 14A calculates the rotational angle parameter tθ so as to match the outer shape characteristic information on the back side with that on the front side based upon the outer shape characteristic information on the front side and the back side after the parallel shift. For the outer shape characteristic information on the front side and the back side after the parallel shift, the number of the pieces of the outer shape characteristic information on the front side, and the coordinate value are regarded as M and $(x_{fi}, y_{fi})$, i=1, . . . , M, respectively, and the number of the pieces of the outer shape characteristic information on the back side, and the coordinate value are regarded as N and $(x_{bj}, y_{bj})$, j=1, . . . , N, respectively. The outer shape characteristic information on the back side is rotational-transferred with the expression (21).

(Expression 21)

$$\begin{cases} X_{bj} = x_{bj}\cos t\theta_f - y_{bj}\sin t\theta_f \\ Y_{bj} = x_{bj}\sin t\theta_f + y_{bj}\cos t\theta_f \end{cases} \quad (21)$$

Then, an evaluation function func (tθ) for evaluating the degree of confidence of the rotational angle parameter tθ is obtained. The evaluation function func (tθ) is a total sum of the distance between the outer shape characteristic information on the back side and that on the front side after the rotational transfer. Herein, distance $d_{ij}$ between coordinate values $(X_{bj}, Y_{bj})$ of the outer shape characteristic information on the back side after the rotational transfer and coordinate values $(X_{fi}, Y_{fi})$ of the outer shape characteristic information on the front side after the rotational transfer can be calculated with the expression (22).

(Expression 22)

$$d_{ij} = \sqrt{(X_{bj}-X_{fi})^2 + (Y_{bj}-Y_{fi})^2} \quad (22)$$

Relating the outer shape characteristic information on the front side with that on the back side for obtaining the distance shall be the outer shape characteristic information on the back side, which is the closest from that on the front side. On this occasion, two or more pieces of outer shape characteristic information on the back side can be matched with one piece of outer shape characteristic information on the front side. Thus, the related correspondent relationship is regarded as J(i), J∈ (1, . . . , N). This symbol i represents a numerical number relating to the outer shape characteristic information on the front side (i=1, . . . , M). Herein, the evaluation function func (tθ) can be calculated with the expression (23).

(Expression 23)

$$func(t\theta) = \sum_{i=1}^{M} d_{i,J(i)} \quad (23)$$

The smaller an evaluation value calculated from the evaluation function func (t$\theta$) becomes, the better it is. Herein, the rotational angle parameter t$\theta$ is set at $-\pi/4 \leq \theta \leq \pi/4$, and for example the rotational angle parameter t$\theta$ is changed by 1° and the evaluation value is calculated, and the rotational angle parameter t$\theta$ where the evaluation value becomes minimal is obtained. In the meantime, when the minimal evaluation value is greater than a predetermined value, it is regarded as a failed calculation of the position adjustment parameters, and the image forming device 1 performs a process to allow the display unit 105 to display an error message, such as "Sizes of the manuscript are different between the front side and the back side."

Next, in order to correct the parallel shift so as to align the coordinates of the center of gravity on the front side after this rotational transfer with those on the back side, the parallel shift parameters, $tx_{1x}$, $tx_{2x}$ and $ty_{2y}$, are calculated with the expressions (24) and (25). The position adjustment parameter calculating part 14A regards the values where the coordinates of the center of density on the back side calculated at S1601 are multiplied by "−1" as first parallel shift parameters $tx_{1x}$ and $ty_{1y}$, respectively.

(Expression 24)

$$\begin{cases} tx_{1x} = -x_{bg} \\ ty_{1y} = -y_{bg} \end{cases} \quad (24)$$

In addition, the position adjustment parameter calculating part 14A regards the values where the coordinates of the center of gravity on the front side calculated at S1601 are multiplied by "−1" as second parallel shift parameters $tx_{2x}$ and $ty_{2y}$, respectively.

(Expression 25)

$$\begin{cases} tx_{2x} = -x_{fg} \\ ty_{2y} = -y_{fg} \end{cases} \quad (25)$$

(Image Data Correction Part 15A) The image data correction part 15A corrects the image data on the back side by parallel shift based upon the first parallel shift parameters $tx_{1x}$ and $ty_{1y}$ calculated by the position adjustment parameter calculating part 14A. Then, the parallel-shift-corrected image data on the back side is rotatably corrected based upon the rotational angle parameter t$\theta$. In addition, the rotational-corrected image data on the back side is corrected by parallel shift based upon the second parallel shift parameters $tx_{2x}$ and $ty_{2y}$. With the processing, the image data on the back side can be corrected to adjust the position aligned with the image data on the front side. Then, the reversed back correction image data DXb is produced from the corrected image data on the back side based upon the reverse direction information, and is stored in the memory part 20. Any processing hereafter is the same as those in the image forming device of the first embodiment.

In the image forming device of the second embodiment having the above-mentioned configuration, a user allows the image forming device to read a manuscript (rectangular medium) using a scanner, etc. and merely enters the first image data including the front-side shape of the manuscript and the second image data including the back-side shape of the manuscript produced by the scanner, and then, can provide image data where the front-side shape of the manuscript included in first image data is aligned with the back-side shape of the manuscript included in second image data (front correction image data DXf and back correction image data DXb). Consequently, since the user can avoid his/her trouble to manually adjust positions of the image, the working hours can be drastically reduced. Further, when the front correction image data DXf is printed on the front side of the output medium and the back correction image data DXb is printed on the back side of the output medium, printing with four matched corners can be conducted.

Further, in the image forming device of the second embodiment, a manuscript to be read does not have to be rectangular, but for example, a quadrilateral manuscript having four sides, such as trapezoid or parallelogram, is also acceptable, and a polygonal manuscript is also acceptable. However, in the case of a manuscript with shape having all the same length of sides (for example, regular polygon) or a circular manuscript, it is necessary to consider the range of the rotational angle parameter t$\theta$ calculated by the position adjustment parameter calculating part 14A.

In the first embodiment and the second embodiment, when the manuscript reading part 103 of the scanner part 100 reads a manuscript for the purpose of producing image data where edges of the manuscript (rectangular region) are certainly extracted, a portion to be background (for example, a cover to cover the platen 101) are dotted, or can have opposite color from the manuscript color.

In the first embodiment and the second embodiment, an example where the image forming device 1 (1A) having the image processing device (image processing part 10) is applied to a multifunction machine having the scanner part 100 and the printing part 200 was explained, and the image forming device 1 (1A) is also applicable to a copier or a facsimile (FAX). Further, this is also applicable as an image forming device in the form where a computer is used as the image processing part 10 and the computer is designed to enable to transmit/receive data and is connected to a scanner (scanner part 100) and a printer (printing part 200).

Further, the example where image data is entered from the scanner part 100 was explained, and this is also applicable in the form where the image processing device (image processing unit 10) acquires image data via a memory medium, such as an hard disk, RAM, an optical disk, or a communication network.

Image data to be entered into the image processing part 10 (image data acquiring part 11) includes a rectangular region, and as long as this is image data that can recognize the shape of the rectangular region, the format, such as PNG, JPEG or GIF, is acceptable, and an image format is no object.

What is claimed is:
1. An image processing device that acquires both first image data and second image data, each of which is included in a rectangular region, wherein shape and area of rectangular regions are same, and that aligns the shape of the rectangular region of the first image data with that of the second image data, the device comprising:
an image data acquiring part that acquires the first image data and the second image data;

an edge characteristic extraction part that extracts both first edges forming the shape of the rectangular region contained in the first image data and second edges forming the shape of the rectangular region;

a rectangular characteristic calculating part that extracts both a first calculated rectangular region formed by the first edges and a second calculated rectangular region formed by the second edges;

a position adjustment parameter calculating part that calculates parameters indicating a separation distance and a separation angle between the first calculated rectangular region and the second calculated rectangular region when the first image data and the second image data are overlapped; and an image data correction part that adjusts a position of one of the first image data and the second image data to an original position of the other one of the first image data and the second image data by shifting and rotating only the one of the first image data and the second image data based upon the parameters, wherein the position adjustment parameter calculating part determines whether or not a size of the first calculated rectangular region matches a size of the second calculated rectangular region, the image data correction part perform the adjustment if the size of the first calculated rectangular region matches the size of the second calculated rectangular region, the image data correction part does not perform the adjustment if the size of the first calculated rectangular region does not match the size of the second calculated rectangular region.

2. The image processing device according to claim 1, wherein the image data acquiring part reverses the acquired second image data and regards the reversed second image data as the second image data; and the image data correction part reverses the shifted and rotated second image data, and regards the shifted and rotated image data as the corrected second image data.

3. The image processing device according to claim 2, wherein the image processing device is part of an image forming device, image forming device that comprises:

a scanner part that separately reads two rectangular media, wherein shapes and areas of the two rectangular media are the same, or reads a front side and a back side of one rectangular medium, wherein shapes and areas of the front side and the back side are the same, and produces the first image data and second image data including the rectangular regions; and a printing part that prints the first image data corrected by the image data correction part on the front side of an output medium and prints the second image data corrected by the image data correction part onto the back side.

4. The image processing device according to claim 2, wherein a direction of reversal by at least one of the image data acquiring part and the image data correction part is the direction selected by a user.

5. The image processing device according to claim 1, wherein the edge characteristic extracting part extracts edge pixel data forming transverse edges of the rectangular region contained in the image data using a Sobel filter, produces transverse edge characteristic image data, further extracts edge pixel data forming vertical edges, produces vertical edge characteristic image data, binarizes the transverse characteristic image data and the vertical characteristic image data, implements a logical OR operation, and extracts the first edges from the first image data and the second edges from the second image data.

6. The image processing device according to claim 1, wherein the rectangular characteristic calculating part extracts four sides from the edges extracted by the edge characteristic extracting part and extracts a region surrounded by the four sides.

7. The image processing device according to claim 6, wherein the four sides extracted by the rectangular characteristic calculating part are obtained by extracting four straight lines from the edge pixel data forming the edges, calculating four equations of straight lines, which are obtained by Hough-transforming the straight lines, and calculating intersections of these equations of straight line and a distance between the intersections.

8. The image processing device according to claim 1, wherein the parameters calculated by the position adjustment parameter calculating part comprise an x-axis direction shift parameter and a y-axis direction shift parameter, on a two-dimensional plane coordinates, and a rotational parameter.

9. The image processing device according to claim 1, wherein one of the first edges and second edges is formed by two pairs of straight lines, and the straight lines of each pair are extracted from a group of a plurality of straight lines based on the distance and the angle between two given straight lines.

10. The image processing device according to claim 1, further comprising:

a display part that displays a notice when a length of one of the first edges of the first image data is different from a length of a corresponding one of the second edges of the second image data by a predetermined amount.

11. The image processing device according to claim 1, wherein the separation distance and the separation angle are calculated from a center of gravity of the first calculated rectangular region and a center of gravity of the second calculated rectangular region, and the image data correction part further adjusts the position of one of the first image data and the second image data to a position of the other one of the first image data and the second image data so that the center of gravity of the first calculated rectangular region and the center of gravity of the second calculated rectangular region match.

12. The image processing device according to claim 1, wherein at least one of edges of the first image data and the second image data can be nonparallel to edges of an output medium onto which the first and second image data are printed, after the image data correction part shifts and rotates only the one of first image data and the second image data based upon the parameters.

13. The image processing device according to claim 1, wherein the rectangular characteristic calculating part further calculates the first calculated rectangular region by determining a first maximum area of the rectangular region contained in the first image data based on the first edges and the second calculated rectangular region by determining a second maximum area of the rectangular region contained in the second image data determined from the second edges, the rectangular characteristic calculating part determines first side lines of the first calculated rectangular region based on the first maximum area and second side lines of the second calculated rectangular region based on the second maximum area, and the position adjustment parameter calculating part calculates the parameters based on the first side lines and the second side lines.

14. The image processing device according to claim 13, wherein the rectangular characteristic calculating part determines distances and angular differences between two of the first side lines and between two of the second side lines and pairs the two of the first side lines and the two of the second side lines if the respective distance is greater than a distance threshold value and if the respective angular distance is less than an angular difference threshold value.

15. The image processing device according to claim 14, wherein the position adjustment parameter calculating part corresponds the paired two of the first side lines and the paired two of the second side lines by calculating an angular difference and a difference in distance from a predetermined position of the paired two of the first side lines and the paired two of the second side lines.

16. The image processing device according to claim 15, wherein the position adjustment parameter calculating part determines whether or not the size of the first calculated rectangular region matches the size of the second calculated rectangular region by comparing lengths of the corresponded paired two of the first side lines and the paired two of the second side lines.

\* \* \* \* \*